(12) United States Patent
Peng et al.

(10) Patent No.: US 7,665,099 B2
(45) Date of Patent: Feb. 16, 2010

(54) LOADING DEVICE FOR A DISK DRIVE

(75) Inventors: Wen-Kuan Peng, Taoyuan County (TW); Yu-Kuang Chang, Taoyuan County (TW); Ching-Hung Chang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 845 days.

(21) Appl. No.: 11/307,074

(22) Filed: Jan. 23, 2006

(65) Prior Publication Data

US 2006/0200836 A1 Sep. 7, 2006

(30) Foreign Application Priority Data

Jan. 28, 2005 (TW) .............................. 94102961 A

(51) Int. Cl.
*G11B 17/04* (2006.01)
(52) U.S. Cl. ..................................................... 720/625
(58) Field of Classification Search ................. 720/638, 720/624, 625, 621
See application file for complete search history.

(56) References Cited

U.S. PATENT DOCUMENTS 5,031,169 A * 7/1991 Kato et al. .................. 720/625

* cited by examiner

*Primary Examiner*—Craig A. Renner
*Assistant Examiner*—Tamara Ashford
(74) *Attorney, Agent, or Firm*—Winston Hsu

(57) ABSTRACT

A loading device for a disk driver includes a transporting unit and a guide unit. The transporting unit includes one roller or two rollers, and the guide unit includes two symmetric or asymmetric cones. When loading a disc, two sides of the disc are individually supported on two cones of the guide unit. Two cones have different cone angles, equal cone angles but unequal lengths, or the same shape but different rotation velocities. The guide unit utilizes different arc speeds on two ends to obliquely convey the disc with any guide rails. The loading device reduces the cost of production and prevents the disc from generating collision and noisy.

11 Claims, 6 Drawing Sheets

LOADING DEVICE FOR A DISK DRIVE

BACKGROUND OF THE INVENTION

1. Field of the Invention

The present invention relates to an optical disk drive, and more particularly to a loading device which obliquely loads or unloads the optical disk drive with a disc to reduce noise caused by the collision between the disc and guide rails.

2. Description of the Prior Art

With the coming of digital multimedia life, notebook computers have widely been used. Some outfits, such as USB bus, IEEE1394 bus, PCI bus, IDE ATA/ATAPI interface, wireless network card, flash memory, and an optical disk drive, are necessary for the notebook computer. Currently, there are various kinds of optical storage media, such as CD (compact disc), VCD (video compact disc), and DVD (digital video disc). Those optical storage media all are the mainstream of the consumer market. The optical disk drive in the computer or player is used to read/write data on those optical storage media.

In general, an optical disk drive can be divided into two types of the disc loading device: one is a tray type and the other is a slot-in type. The tray type utilizes a tray to carry a disc into or out of the optical disk drive. As shown in FIG. 1 and FIG. 2 concerning U.S. Pat. No. 6,650,602, the slot-in type utilizes a roller 91 to convey a disc 70 into or out of the entrance 90 of the optical disk drive. The roller 91 of the prior optical disk drive respectively forms cones 92 a and 92 b with equal angles θa and θb at each end. When the disc 70 is conveyed by the roller 91 into or out of the optical disk drive, the roller 91 supports the disc 70 at two sides which tend to keep equal distance from the center of the roller 91. Therefore, the disc 70 is basically conveyed into or out of the optical disk drive along the center of the roller 91. However, the roller 91 isn't located at the central line of the optical disk drive due to the limitation of room. So guide rails 80, 81are used to obliquely lead the disc 70, which is inserted into the center of the entrance 90, to the center of the roller 91, and then the disc 70 is transported by the roller 91 to the predetermined position 100. Consequently, the disc 70 certainly collides with guide rails 80, 81 during loading process not only to generate collision noisy, but also to damage the disc 70.

SUMMARY OF THE INVENTION

It is one object of the invention to provide a disc loading device which obliquely loads a disc to reduce noisy caused by the collision in the casing and the requirement of guide rails so as to cut down the cost of production.

It is another object of the invention to provide a loading device for a disk driver, which loads a disc by a guide unit forming cones with different angle at each end of a roller to convey the disc toward the cone of the smaller angle to avoid generating noisy and causing damage.

It is further object of the invention to provide a loading device for a disk driver, which loads a disc by a guide unit forming cones with different length at each end of a roller to convey the disc toward the cone of the smaller length to avoid generating noisy and causing damage.

For achieving the above objects, the present invention provides a loading device for a disk driver, which mainly includes a transporting unit and a guide unit. The transporting unit includes one roller or two rollers, and the guide unit has cones with different angles, with equal angles but different lengths, or with equal angles but different velocities of rotation at two ends of the roller. The guide unit covers on the transporting unit, that is, the cones are individually formed on two ends of the transporting unit. The cone with the bigger angle is located at the farther end from the positioning place of the disc, and the cone with the smaller angle is located at the nearer end. The longer cone is located at the farther end from the positioning place of the disc, and the shorter cone is located at the nearer end. The cone on the faster roller is located at the farther end from the positioning place of the disc, and the cone on the slower roller is located at the nearer end. When the disc is inserted into the entrance, the roller conveys the disc which is supported at two sides on the roller. Since the side of the disc on the cone with the bigger angle, the longer cone, or the faster roller travels longer distance than the other side in unit time, the disc obliquely moves to the positioning place in the disk drive. On the contrary, the disc obliquely moves to the entrance when the disc ejects from the disk drive.

Further features and advantages of the invention, as well as the structure and operation of various embodiments of the invention, are described in detail below with reference to the accompanying drawings.

DETAILED DESCRIPTION

Figure 1:
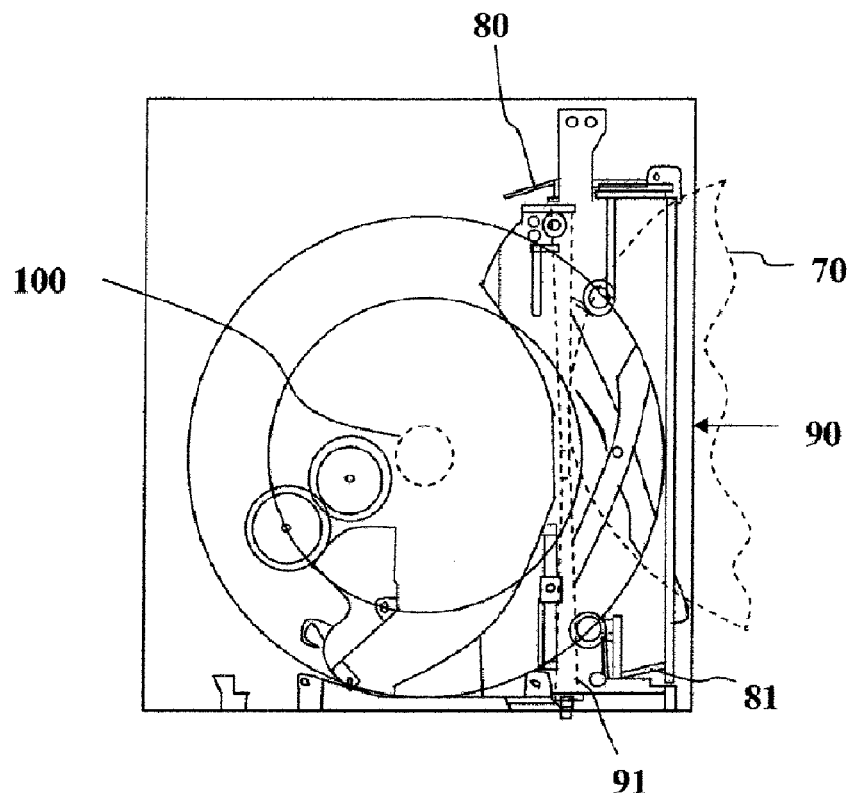
FIG. 1 is a schematic view of a conventional slot-in disk drive.
Figure 2:
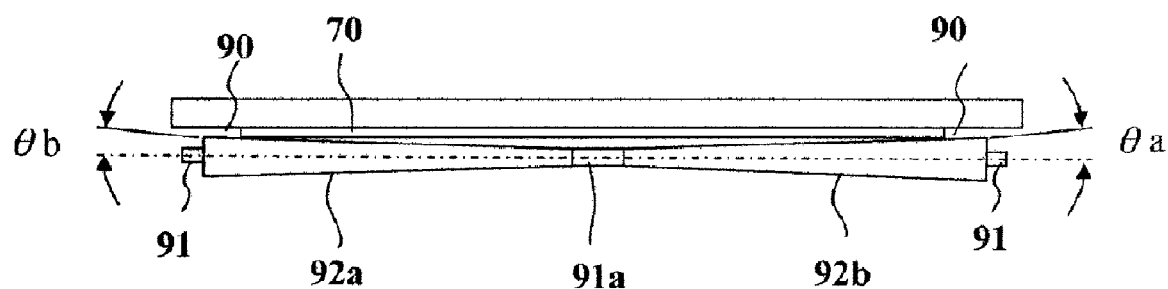
FIG. 2 is a schematic view of the roller in a conventional slot-in disk drive.

Before the description of the present invention, it is noted that like parts are designated by like reference numerals throughout the following description.

Figure 3:
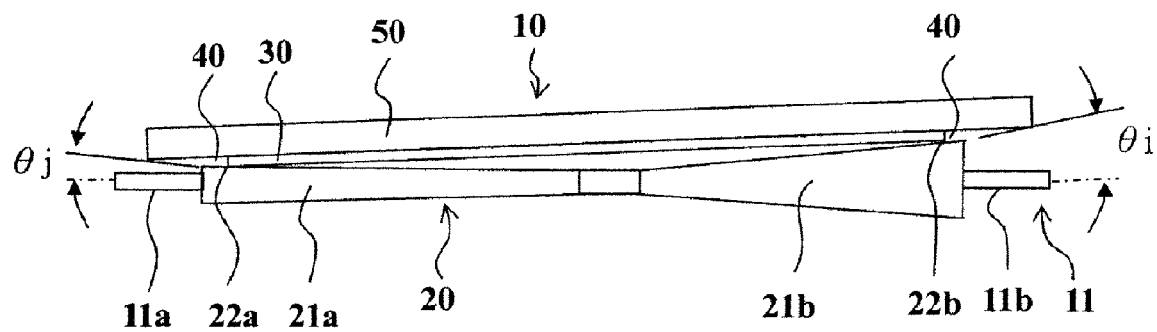
FIG. 3 is a schematic view of a loading device in the first embodiment of the present invention.

Referring to FIG. 3, a schematic view of a loading device 10 in the first embodiment of the present invention is shown. The loading device 10 includes a transporting unit 11, a guide unit 20, an entrance 40, and a guide plate 50. The transporting unit 11 includes rollers 11a and 11b, and the guide unit 20 includes cones 21a and 21b. A disc is inserted into or taken out of the entrance 40 arranged between the guide plate 50 and the transporting unit 11. The transporting unit 11 can be a roller of a geometric pillar or a column, and a column roller is preferred. The guide unit 20 is a couple of asymmetric cones with different angles, which is respectively disposed at each end of the transporting unit 11. That is, the cone 21a is disposed at the roller 11a, and the cone 21b is disposed at the roller 11b. The angle θj of the cone 21a is smaller than the angle θi of the cone 21b, i.e. θj<θi. The disc 30 is supported at the contacts 22a and 22b of the guide unit 20. Due to the different angle of the cone where the contacts 22a and 22b with equal distance from the center of the transporting unit 11 contact, the cone at each contacts 22a and 22b rotates a different arc length in unit time when the rollers 11a and 11b rotate to move the disc 30. The contact 22a travels smaller arc length than the contact 22b to cause the disc 30 to move toward the direction of the contact 22a.

Figure 4:
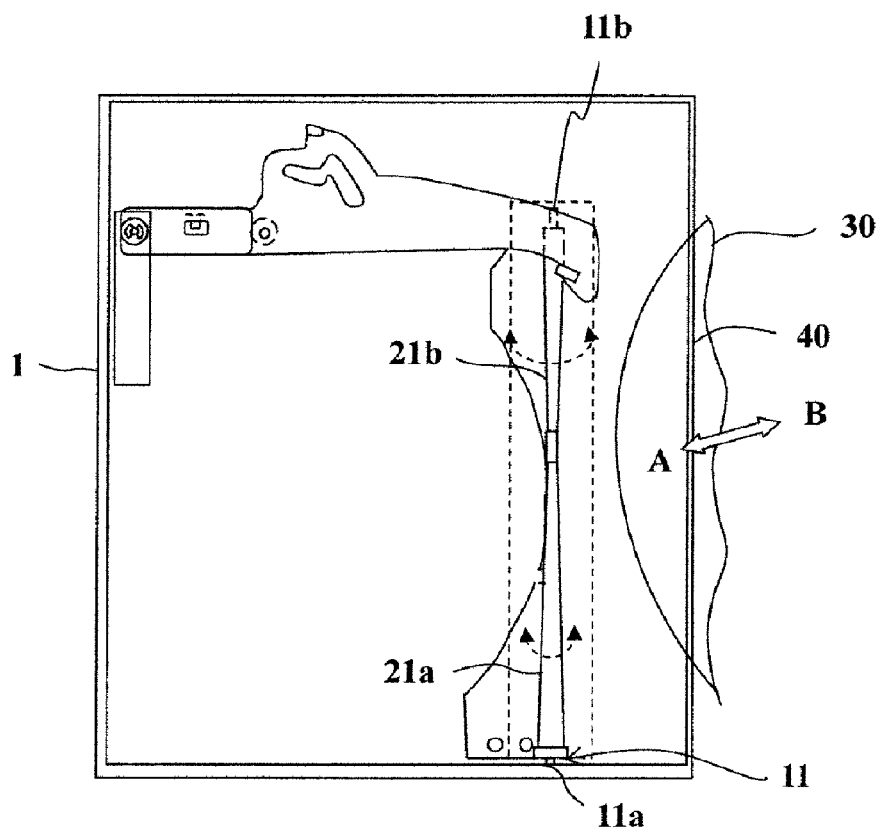
FIG. 4 is a schematic view showing that the first embodiment of the present invention is used in a disk drive.

Shown as in FIG. 4, the first embodiment of the present invention is applied in a disk drive. The loading device 10 is disposed in a disk drive 1. When the disc 30 is inserted into the entrance 40, the transporting unit 11 conveys the disc 30 into the disk drive 1. Two sides of the disc 30 are individually supported at two asymmetric cones 21a and 21b. Since the angle of the cone 21a is smaller than the angle of the cone 21b, the cone 21b moves the disc 30 to travel longer arc length than the cone 21a following the rotation of the rollers 11a and 11b. Therefore, the disc 30 obliquely moves into the disk drive 1 along the A-B direction without the guidance of guide rails so as to prevent the disc 30 from generating collision and noisy. The disk drive can get rid of the component of guide rails and reduce the cost of production.

Figure 5:
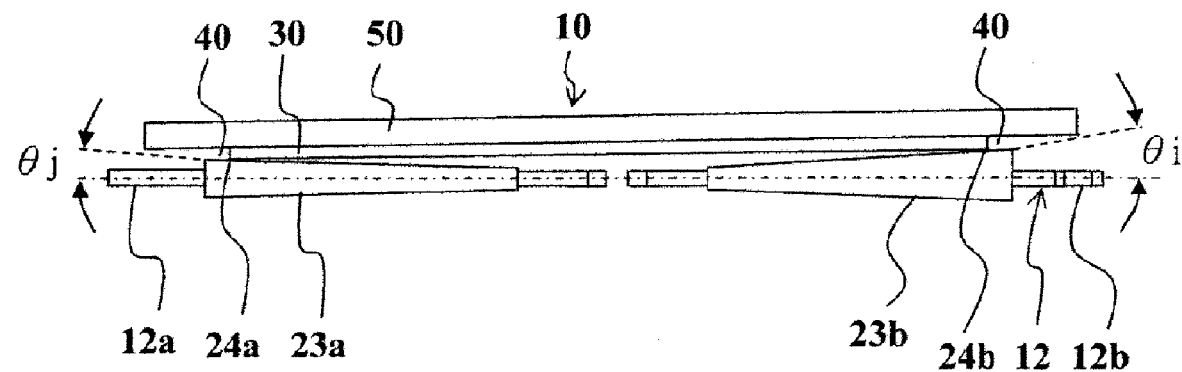
FIG. 5 is a schematic view of a loading device in the second embodiment of the present invention.
Figure 6:
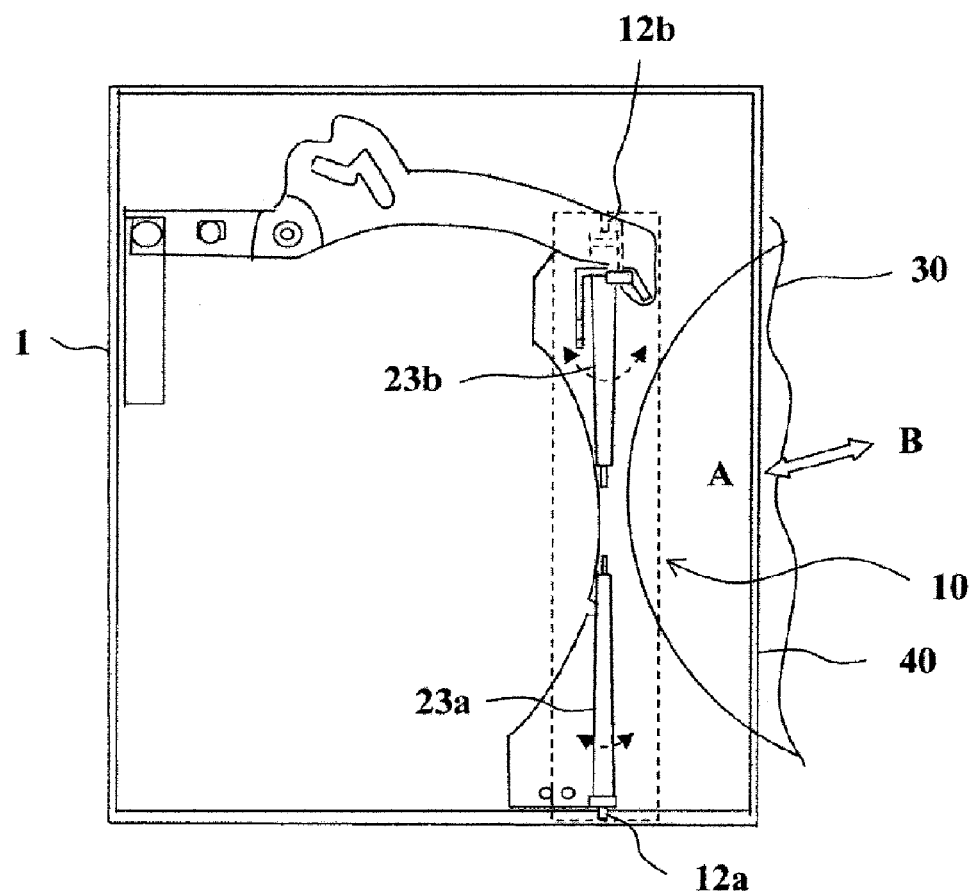
FIG. 6 is a schematic view showing that the second embodiment of the present invention is used in a disk drive.

Referring to FIG. 5, a schematic view of a loading device in the second embodiment of the present invention is shown. The basic structure of the second embodiment is similar to the first embodiment. The transporting unit 12 of the loading device 10 in the second embodiment is two coaxial rollers 12a and 12b. Two rollers 12a and 12b individually have asymmetric cones 23a and 23b with different cone angle. The angle θi of the cone 23b is bigger than the angle θj of the cone 23a, i.e. θi>θj. The disc 30 is supported at the contacts 24a and 24b. When two rollers 12a and 12b rotate at different angular velocities, two contacts 24a and 24b individually move different arc lengths to cause the disc 30 to obliquely enter the disk drive 1. The second embodiment of the present invention is applied in a disk drive 1, shown as in FIG. 6. Because of cones 23a and 23b with different cone angles, the disc 30 obliquely moves into the disk drive 1 along the A-B direction without the guidance of guide rails so as to prevent the disc 30 from generating collision and noisy. The disk drive can get rid of the component of guide rails and reduce the cost of production.

Figure 7:
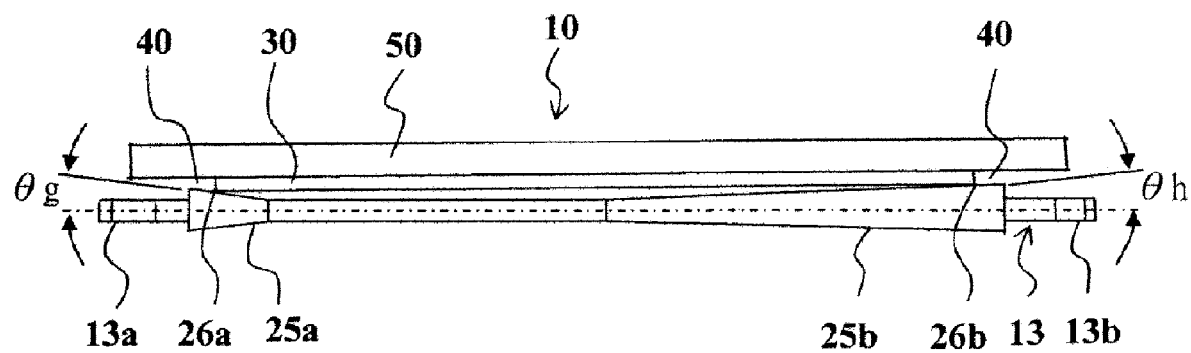
FIG. 7 is a schematic view of a loading device in the third embodiment of the present invention.
Figure 8:
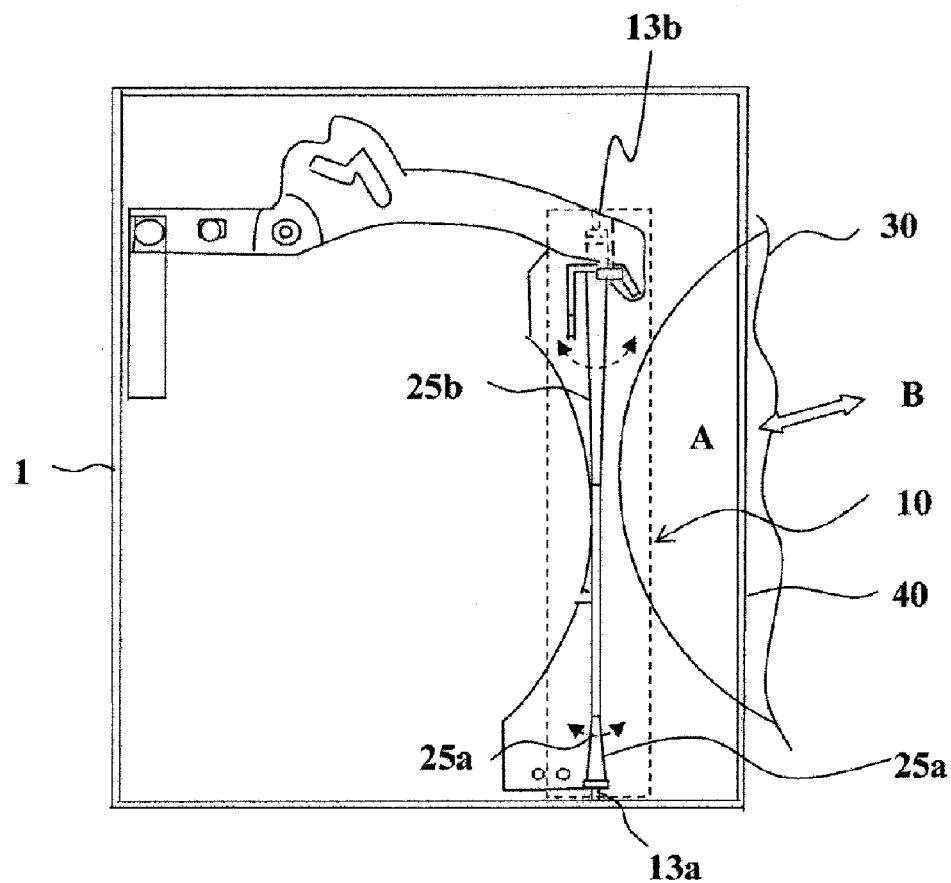
FIG. 8 is a schematic view showing that the third embodiment of the present invention is used in a disk drive.

Referring to FIG. 7, a schematic view of a loading device in the third embodiment of the present invention is shown. The basic structure of the third embodiment is similar to the first embodiment. The transporting unit 13 of the loading device 10 in the third embodiment has two rollers 13a and 13b. Two ends of the transporting unit 13 are disposed a guide unit consisting of two asymmetric cones 25a and 25b which have equal cone angles, i.e. θg=θh, but which have unequal lengths. The disc 30 is supported at two contacts 26a and 26b which are individually disposed on the cones 25a and 25b. Since being individually located on the cones 25a and 25b with different lengths, two contacts 26a and 26b travel different arc lengths when the transporting unit 13 rotates in unit time. The longer the length of the cone, the longer arc length the contact will travel. Therefore, two contacts 26a and 26b travel unequal arc lengths to cause the disc 30 to obliquely move into a disk drive. The third embodiment of the present invention is applied in the disk drive 1, shown as in FIG. 8. Because of cones 25a and 25b with different lengths, the disc 30 obliquely moves into the disk drive 1 along the A-B direction without the guidance of guide rails so as to prevent the disc 30 from generating collision and noisy. The disk drive can get rid of the component of guide rails and reduce the cost of production.

Figure 9:
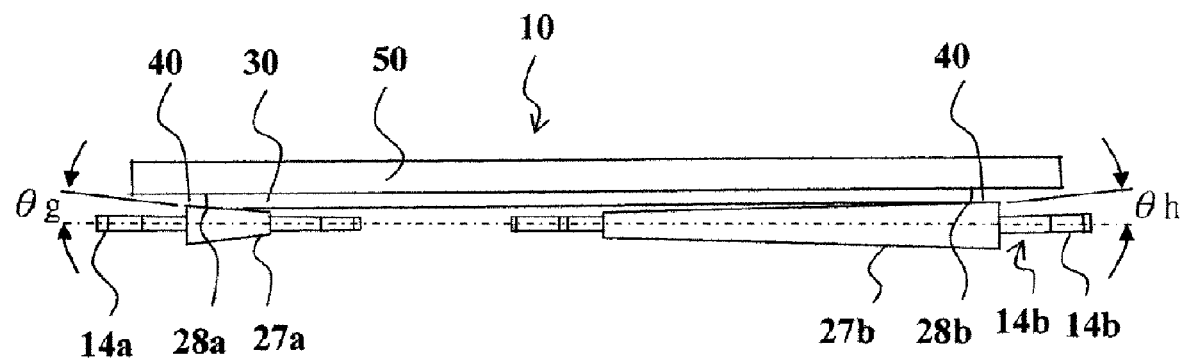
FIG. 9 is a schematic view of a loading device in the fourth embodiment of the present invention.
Figure 10:
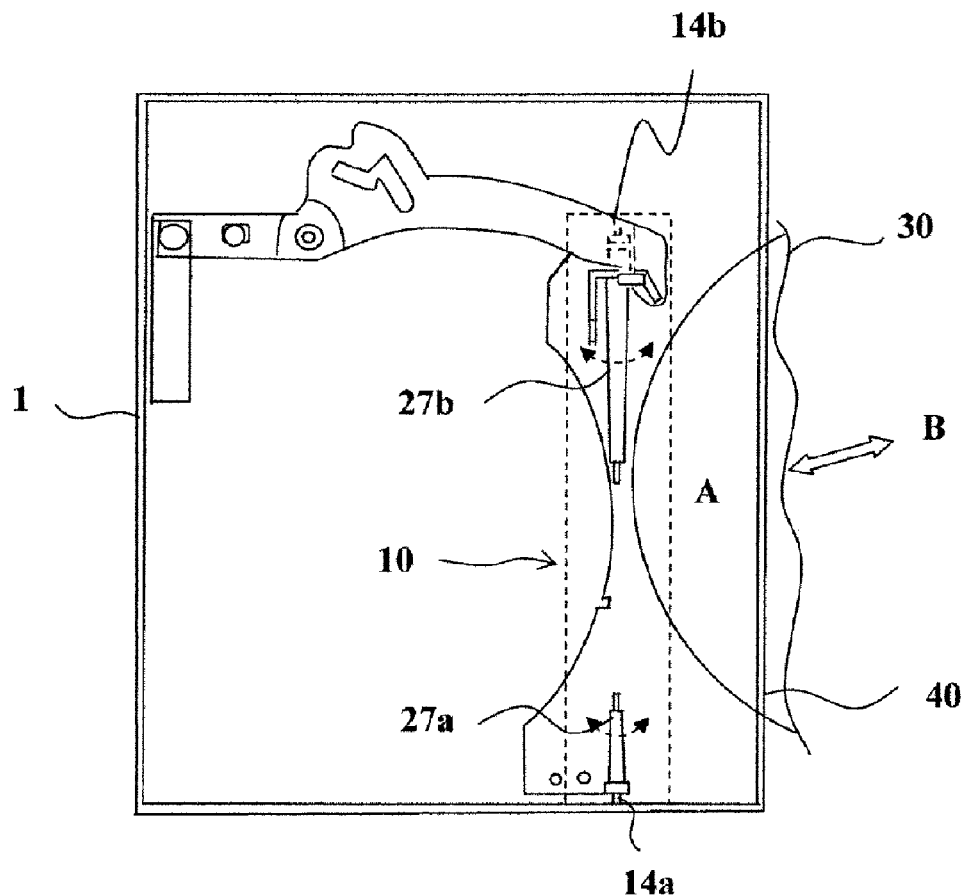
FIG. 10 is a schematic view showing that the fourth embodiment of the present invention is used in a disk drive.

As shown in FIG. 9, a schematic view of a loading device in the fourth embodiment of the present invention is shown. The basic structure of the fourth embodiment is similar to the first embodiment. The transporting unit 14 of the loading device 10 in the fourth embodiment includes two coaxial rollers 14a and 14b provided with a guide unit which is consisted of two asymmetric cones 27a and 27b with equal angles, i.e. θg=θh, but unequal lengths. The disc 30 is supported at two contacts 28a and 28b which are individually disposed on the cones 27a and 27b. When two rollers 14a and 14b rotate at equal or unequal angular velocity, two contacts 28a and 28b travel different arc lengths due to the cones 27a and 27b with different lengths to cause the disc 30 to obliquely move into a disk drive. The fourth embodiment of the present invention is applied in the disk drive 1, shown as in FIG. 10. Because of cones 27a and 27b with different lengths, the disc 30 obliquely moves into the disk drive 1 along the A-B direction without the guidance of guide rails so as to prevent the disc 30 from generating collision and noisy. The disk drive can get rid of the component of guide rails and reduce the cost of production.

Figure 11:
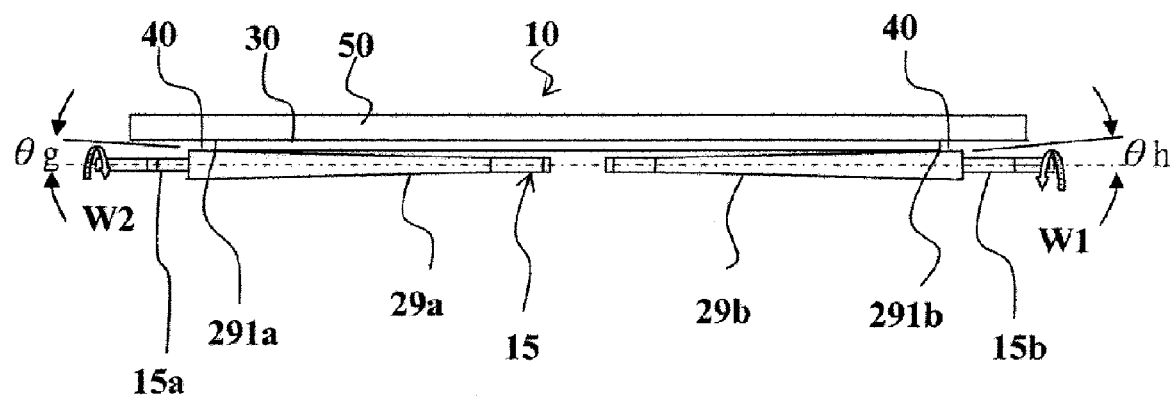
FIG. 11 is a schematic view of a loading device in the fifth embodiment of the present invention.
Figure 12:
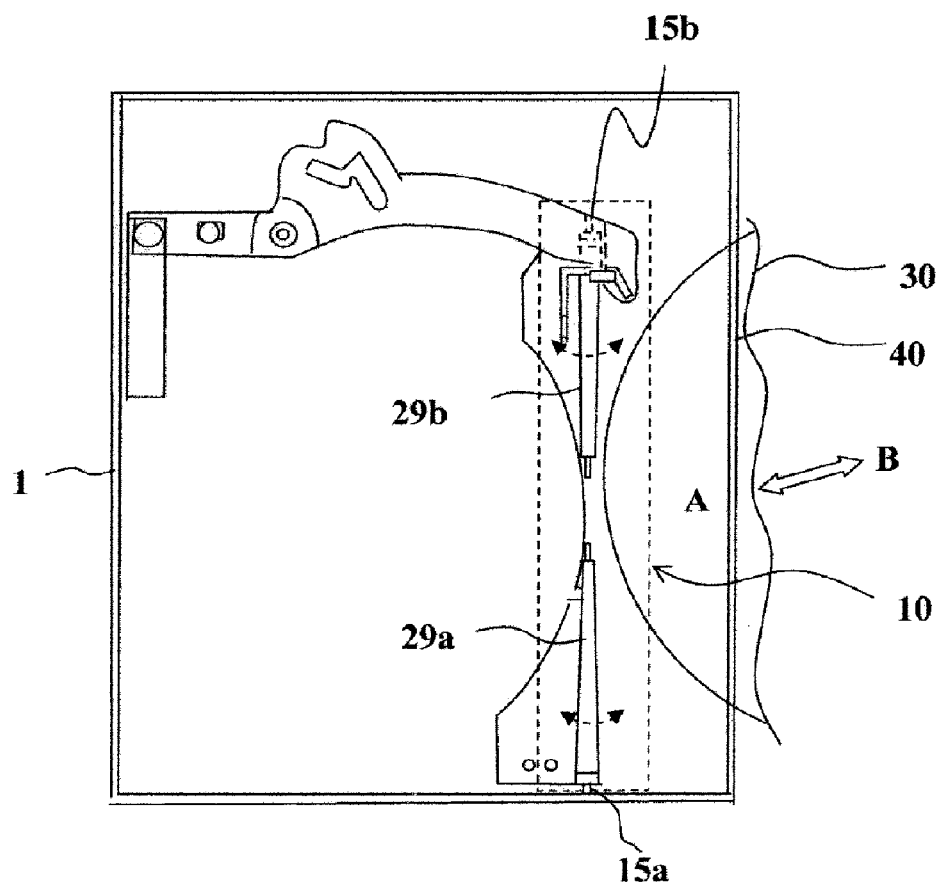
FIG. 12 is a schematic view showing that the fifth embodiment of the present invention is used in a disk drive.

As shown in FIG. 11, a schematic view of a loading device in the fifth embodiment of the present invention is shown. The basic structure of the fourth embodiment is similar to the first embodiment. There is one apparently different feature of the loading device 10 between the fifth embodiment and above-mentioned embodiments. The guide unit on the transporting unit 15 of the loading device 10 in the fifth embodiment includes two cones 29a and 29b with equal angles, i.e. θg=θh, and equal lengths. The transporting unit 15 includes two rollers 15a and 15b which rotate at different angular velocities. Because the angular velocity W2 of the roller 15b is bigger than the angular velocity W1 of the roller 15a, the symmetric position of two cones 29a and 29b rotates at a different arc speed. The disc 30 is supported at two contacts 291a and 291b which are individually disposed on the cones 29a and 29b. When two rollers 15a and 15b rotate at unequal angular velocity, two contacts 291a and 291b travel different arc lengths to cause the disc 30 to obliquely move into a disk drive. The fifth embodiment of the present invention is applied in the disk drive 1, shown as in FIG. 12. Because two rollers 15a and 15b rotate at different angular velocities, the disc 30 obliquely moves into the disk drive 1 along the A-B direction without the guidance of guide rails so as to prevent the disc 30 from generating collision and noisy. The disk drive can get rid of the component of guide rails and reduce the cost of production.

The present invention utilizes two elastic cones, which are unequal cone angles, equal cone angles and unequal lengths, or equal cone angles and lengths but unequal angular velocities of the rollers, to provide two different arc speeds. Since two sides of the disc supported by two cones are driven to rotate at different arc speeds, the disc obliquely moves toward the cone with a smaller arc speed to cause the disc to obliquely move into the disk drive directly. The present invention improves the drawbacks of the conventional slot-in disk drive in which the disc needs guide rails to lead to the positioning place, and prevents the disc from generating collision and noisy to reduce the cost of production. Meanwhile, the present invention provides a resolution of controlling the rotation of the roller to cause the disc to obliquely move into the disk drive.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A loading device for a disk drive comprising:
   a transporting unit which is provided with at least one roller to load a disc; and
   a guide unit which covers two ends of the transporting unit, is driven by the transporting unit, and has different arc speeds to obliquely move the disc, wherein the guide unit is two asymmetric cones each having a different cone angle.

2. The loading device for a disk drive of claim 1, wherein the transporting unit is a column roller.

3. The loading device for a disk drive of claim 1, wherein the transporting unit is two column rollers.

4. The loading device for a disk drive of claim 1, wherein two sides of the disc are individually supported on two ends of the guide unit with different arc speeds to obliquely convey the disc.

5. The loading device for a disk drive of claim 1, wherein the length of said two cones is different.

6. The loading device for a disk drive of claim 1, wherein said two asymmetric cones are rotated by the roller at different angular velocities.

7. An optical disk drive comprising:
   a casing;
   a loading device disposed in the casing, comprising;
      a transporting unit conveying a disc into/out of the optical disk drive; and
      a guide unit which covers two ends of the transporting unit to form different arc speeds to obliquely move the disc, wherein the guide unit is two asymmetric cones each having a different cone angle.

8. The optical disk drive of claim 7, wherein the transporting unit is a column roller.

9. The optical disk drive of claim 7, wherein the transporting unit is a column roller is two column rollers.

10. The optical disk drive of claim 7, wherein two sides of the disc are individually supported on two ends of the guide unit with different arc speeds to obliquely convey the disc.

11. The optical disk drive of claim 7, wherein said two asymmetric cones are rotated by the roller at different angular velocities.

* * * * *